United States Patent
Shigeta et al.

(10) Patent No.: US 6,907,953 B2
(45) Date of Patent: Jun. 21, 2005

(54) DRIVING FORCE DISTRIBUTION CONTROL DEVICE AND DRIVING FORCE DISTRIBUTION METHOD FOR FOUR-WHEEL DRIVE VEHICLE

(75) Inventors: Ryohei Shigeta, Aichi-ken (JP); Tsuyoshi Murakami, Aichi-ken (JP); Akihiro Ohno, Aichi-ken (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/486,928
(22) PCT Filed: Apr. 28, 2003
(86) PCT No.: PCT/JP03/05423
§ 371 (c)(1),
(2), (4) Date: Feb. 25, 2004
(87) PCT Pub. No.: WO03/091058
PCT Pub. Date: Nov. 6, 2003

(65) Prior Publication Data
US 2004/0222029 A1 Nov. 11, 2004

(30) Foreign Application Priority Data
Apr. 26, 2002 (JP) ............................... 2002-126244

(51) Int. Cl.$^7$ ............................................. B60K 17/344
(52) U.S. Cl. ....................................... 180/248; 180/245
(58) Field of Search ................................ 180/233, 248, 180/249, 245; 701/51, 66

(56) References Cited
U.S. PATENT DOCUMENTS

| | | | | |
|---|---|---|---|---|
| 4,773,500 A | * | 9/1988 | Naito et al. ................ | 180/223 |
| 5,270,930 A | * | 12/1993 | Ito et al. ..................... | 701/69 |
| 5,471,390 A | * | 11/1995 | Sasaki ........................ | 701/78 |
| 5,631,829 A | * | 5/1997 | Takasaki et al. ............ | 701/69 |
| 5,839,084 A | * | 11/1998 | Takasaki et al. ............ | 701/67 |
| 6,512,972 B1 | * | 1/2003 | Glab et al. .................. | 701/69 |
| 6,575,261 B2 | | 6/2003 | Mori et al. | |
| 6,606,549 B1 | | 8/2003 | Murakami et al. | |
| 6,662,893 B2 | * | 12/2003 | Fukuda et al. .............. | 180/249 |

FOREIGN PATENT DOCUMENTS

| | | |
|---|---|---|
| DE | 3840004 | 5/1990 |
| JP | 63-11438 | 1/1988 |
| JP | 10-129288 | 5/1998 |

* cited by examiner

*Primary Examiner*—Avraham Lerner
(74) *Attorney, Agent, or Firm*—Oblon, Spivak, McClelland, Maier & Neustadt, P.C.

(57) ABSTRACT

An ECU, which functions as a driving force distribution control apparatus for a four-wheel drive vehicle, includes a CPU. The CPU controls a coupling for changing torque distribution of front and rear wheels. The CPU determines either of first and second torque distribution modes based on detection signals of a throttle opening sensor and steering angle sensor, which are operating parameters. In the second torque distribution mode, torque is distributed to the front and rear wheels more equally than in the first torque distribution mode. The CPU sets a duration for the second torque distribution mode when the second torque distribution mode is selected. Until the duration elapses, regardless of the operating parameters, the CPU continues the control of the coupling in the second torque distribution mode.

19 Claims, 6 Drawing Sheets

DRIVING FORCE DISTRIBUTION CONTROL DEVICE AND DRIVING FORCE DISTRIBUTION METHOD FOR FOUR-WHEEL DRIVE VEHICLE

CROSS-REFERENCE TO RELATED APPLICATIONS

This application is based upon and claims the benefit of priority from prior Japanese patent application number 2002-126224, filed Apr. 26, 2002, the entire contents of which are incorporated herein by reference.

FIELD OF THE INVENTION

The present invention relates to a driving force distribution control apparatus and driving force distribution method for a four-wheel drive vehicle.

BACKGROUND OF THE INVENTION

A driving system for a four-wheel drive vehicle includes: a part-time driving system for appropriately switching between four-wheel drive and two-wheel drive; a full-time driving system for continuously driving four wheels; and a standby driving system for transition between four-wheel drive and two-wheel drive states as occasion demands. In the standby driving system, a main drive wheel is directly coupled to an internal combustion engine, and a sub-drive wheel is connected to the internal combustion engine via a coupling. For the coupling, a distribution ratio of the driving force of the main drive wheel to that of the sub-drive wheel, that is, a torque distribution ratio is adjusted in accordance with the road surface condition or operating state. The coupling is controlled by a plurality of torque distribution modes including first and second torque distribution modes.

In the standby driving system, a detected value of a throttle sensor for detecting throttle opening of a throttle valve disposed in the internal combustion engine, and that of a rotation speed sensor, are compared with judgment threshold values. When each detected value is less than the corresponding judgment threshold value, the coupling is controlled in the first torque distribution mode. When each detected value is not less than the corresponding judgment threshold value, the coupling is controlled in the second torque distribution mode.

In the first torque distribution mode, the torque of the engine is supplied mainly to the main drive wheel. In the second torque distribution mode, as compared with the first torque distribution mode, the torque is nearly equally distributed to the main and sub-drive wheels. When the four-wheel drive vehicle travels around a curve, or when the driver steps on the accelerator, the torque distribution mode of the coupling is changed to the second torque distribution mode from the first torque distribution mode so as to enhance traction between the road surface and vehicle wheels. Moreover, when the four-wheel drive vehicle is operating in the second torque distribution mode, and the vehicle is not traveling around a curve, and the accelerator setting is not changed, the following happens. At this time, the torque distribution mode of the coupling is changed to the first torque distribution mode from the second torque distribution mode.

When the four-wheel drive vehicle travels on a mountain path or performs slalom-type operation, the first and second torque distribution modes are frequently switched. When the torque distribution mode is frequently switched in this manner, vehicle behavior change frequently occurs (switch shock), and ride quality is impaired.

SUMMARY OF THE INVENTION

An object of the present invention is to provide a driving force distribution control apparatus and driving force distribution method for a four-wheel drive vehicle, in which excessive change of torque distribution can be inhibited.

To achieve the above-described object, according to the present invention, there is provided a driving force distribution control apparatus for a four-wheel drive vehicle. The vehicle includes a drive source, front and rear wheels driven by torque generated by the drive source, and a coupling in which torque distribution to the front and rear wheels can be changed. The driving force distribution control apparatus includes a controller for controlling the coupling. The controller controls the coupling in a torque distribution mode selected from first and second torque distribution modes in accordance with operating parameters indicating an operating state of the vehicle. In the second torque distribution mode, the torque is distributed to the front and rear wheels more equally than in the first torque distribution mode. The controller sets duration of the second torque distribution mode when the second torque distribution mode is selected, and continues to control the coupling in the second torque distribution mode regardless of the operating parameters until the duration elapses.

Moreover, according to the present invention, there is provided the following driving force distribution method of a four-wheel drive vehicle. The vehicle includes a drive source, front and rear wheels driven by a torque generated by the drive source, and a coupling in which torque distribution to the front and rear wheels can be changed. The driving force distribution control method includes: a step of controlling the coupling in a torque distribution mode selected from first and second torque distribution modes in accordance with operating parameters indicating an operating state of the vehicle. In the second torque distribution mode, a torque is distributed to the front and rear wheels more equally than in the first torque distribution mode. The method also includes: a step of setting duration of the second torque distribution mode, when the second torque distribution mode is selected; and a step of continuing the control of the coupling in the second torque distribution mode regardless of the operating parameters until the duration elapses.

BRIEF DESCRIPTION OF THE DRAWINGS

For a better understanding of the present invention together with objects and characteristics of the present invention, the following description of preferred embodiments will be referred to together with the accompanying drawings.

DETAILED DESCRIPTION OF THE PREFERRED EMBODIMENTS

A first embodiment of the present invention will hereinafter be described with reference to FIGS. 1 to 4.

Figure 1:
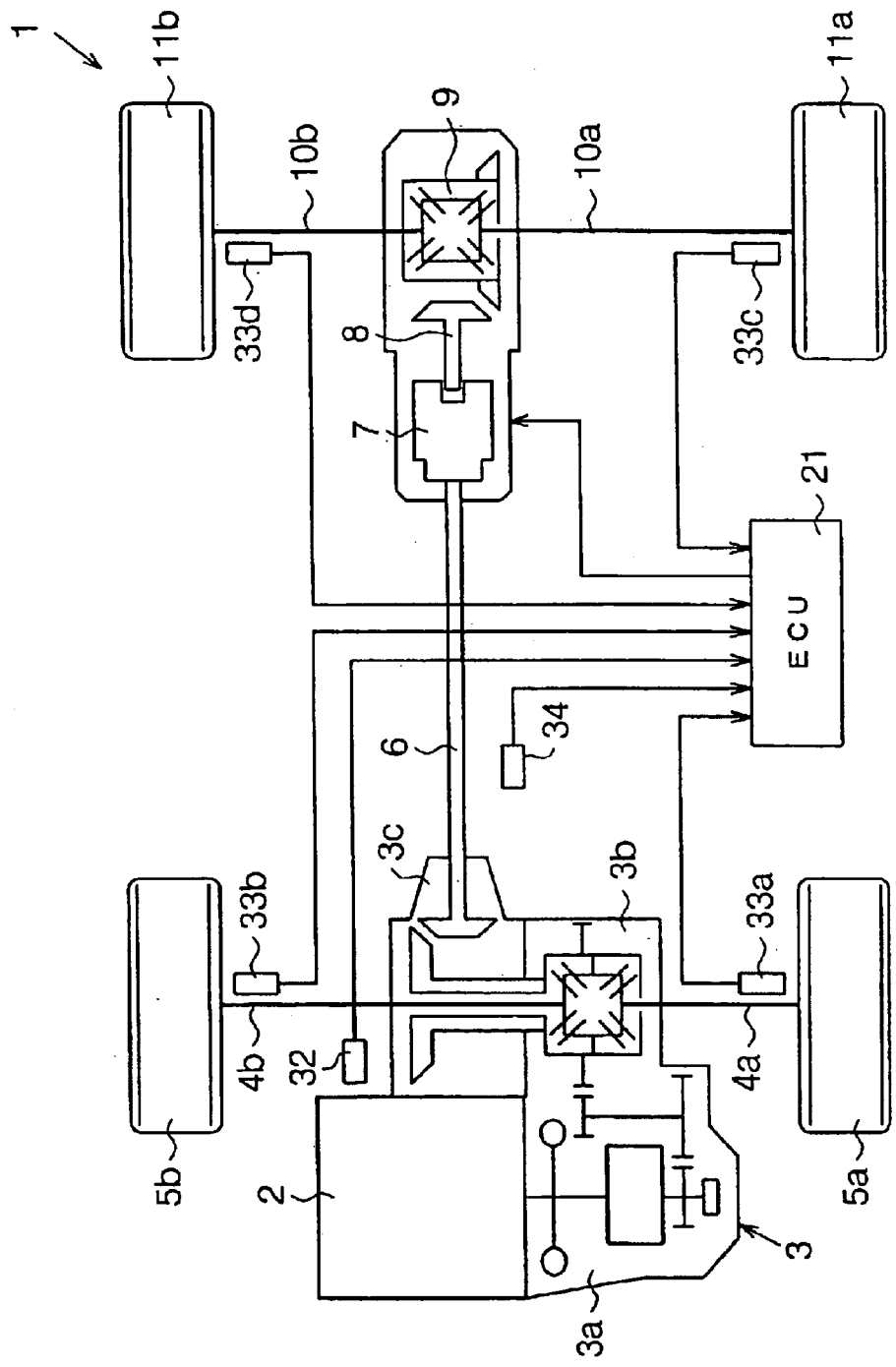
FIG. 1 is a schematic block diagram of a four-wheel drive vehicle in a first embodiment embodying the present invention.

As shown in FIG. 1, a four-wheel drive vehicle 1 includes an internal combustion engine 2 which is a drive source, and a transaxle 3. The transaxle 3 includes a transmission 3a, front differential 3b, and transfer 3c. The front differential 3b is coupled to a pair of front axles 4a, 4b. One pair of front axles 4a, 4b are coupled to left and right front wheels 5a, 5b, respectively.

The driving force of the internal combustion engine 2 is transmitted to the front wheels 5a, 5b via the transmission 3a, front differential 3b, and one pair of front axles 4a, 4b.

The transfer 3c is coupled to a propeller shaft 6, and the propeller shaft 6 is coupled to a coupling 7. Therefore, the driving force (torque) of the internal combustion engine 2 is transmitted to the coupling 7 via the transmission 3a, transfer 3c, and propeller shaft 6. The coupling 7 is coupled to a rear differential 9 via a drive pinion shaft 8. The rear differential 9 is coupled to one pair of rear axles 10a, 10b. One pair of rear axles 10a, 10b are coupled to rear wheels 11a, 11b, respectively. The front wheels 5a, 5b are main drive wheels coupled to the engine 2 not via the coupling 7, and the rear wheels 11a, 11b are sub-drive wheels coupled to the engine 2 via the coupling 7.

The coupling 7 includes an electromagnetic clutch mechanism of a wet multiplate system. The electromagnetic clutch mechanism includes a plurality of clutch plates which can be connected/disconnected with respect to an electromagnetic coil 7a (see FIG. 2). Moreover, an amount of current is supplied to the electromagnetic coil 7a in response to a control signal (command value) from an electronic control unit (ECU) 21 described later. The respective clutch plates are mutually frictionally engaged by a force in accordance with the amount of current supplied to the electromagnetic coil 7a, and the driving force of the propeller shaft 6 is transmitted to the drive pinion shaft 8.

The driving force transmitted to the drive pinion shaft 8 from the propeller shaft 6 is determined by the frictional engaging force of the clutch plate, and becomes larger with an increase of the frictional engaging force. The frictional engaging force changes in accordance with the current amount supplied to the electromagnetic coil 7a. Accordingly, a constraint force between the front wheels 5a, 5b and the rear wheels 11a, 11b, that is, a distribution ratio of the torque is changed.

Next, electrical constitution of a transmission control circuit for controlling the coupling 7 will be described.

Figure 2:
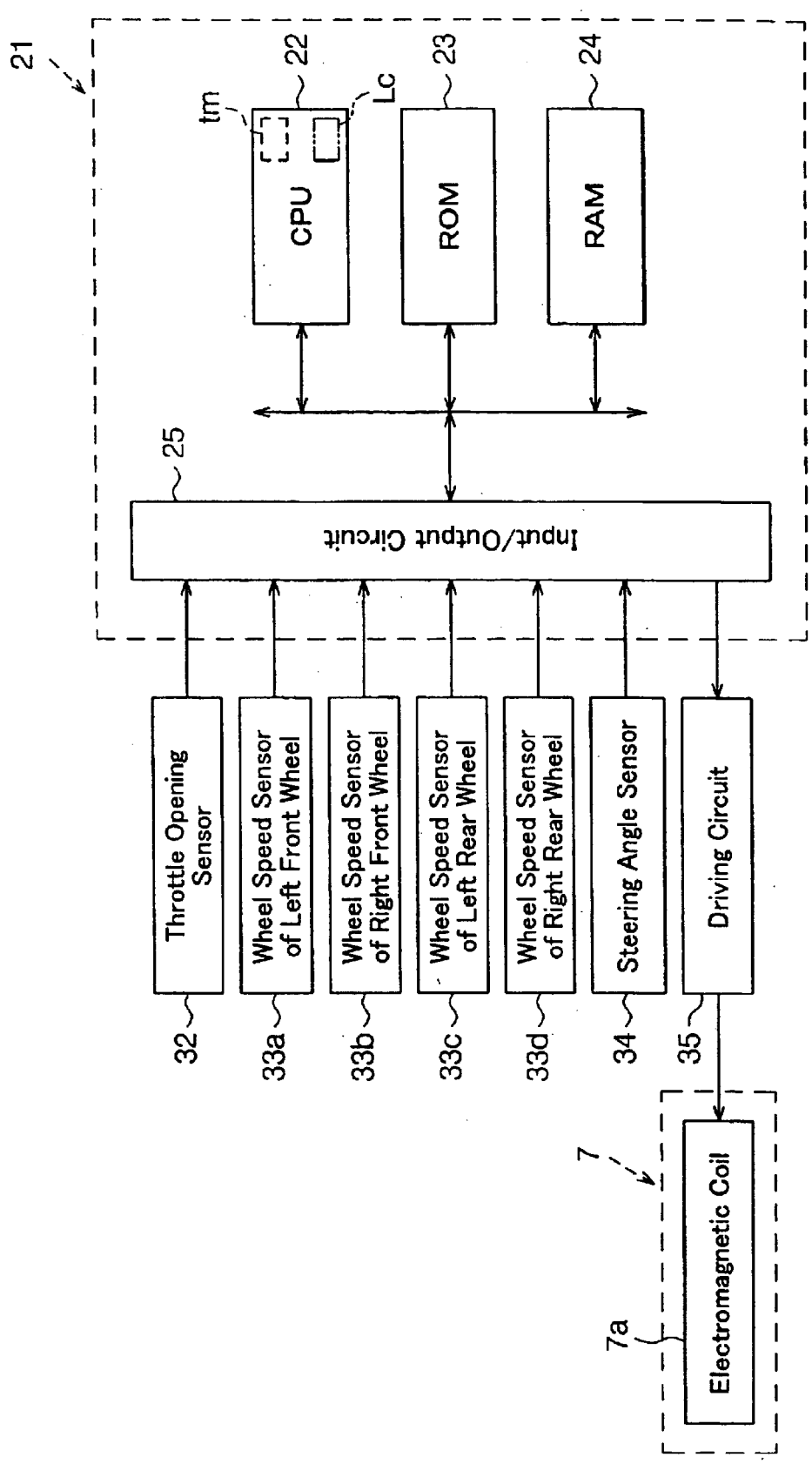
FIG. 2 is a circuit block diagram relating to control of a coupling of the four-wheel drive vehicle of FIG. 1.

As shown in FIG. 2, the transmission control circuit includes the ECU 21 which is a driving force distribution control apparatus for the four-wheel drive vehicle. The ECU 21 includes a CPU 22, ROM 23, RAM 24, and input/output circuit 25. The CPU 22 executes various types of operation processes for controlling the coupling 7, that is, supplying the current to the electromagnetic coil 7a in accordance with various types of programs stored in the ROM 23. In the ROM 23, various types of programs, data, and maps for supplying current to the electromagnetic coil 7a of the coupling 7 are stored. The RAM 24 temporarily stores operation processing results of the CPU 22, or stores various types of data.

Various types of programs stored in the ROM 23 include a control program, and a mode switch program. The control program includes a program for the torque distribution mode of the coupling 7, that is, a control program for the first torque distribution mode and that for the second torque distribution mode. In each control program, the current value to be supplied to the electromagnetic coil 7a is calculated in accordance with the operating state of the vehicle. Based on the calculated current value, the current is supplied to the electromagnetic coil 7a via the input/output circuit 25.

The ECU 21 determines the operating state of the four-wheel drive vehicle 1 at a constant time interval in accordance with the mode switch program, and switches the torque distribution mode of the coupling 7 between the first and second torque distribution modes based on the determination results.

In the present embodiment, operating parameters indicating the operating state include a steering angle $\theta$ of the steering wheel (not shown), and a throttle opening Th of a throttle valve (not shown).

Various types of maps stored in the ROM 23 include the corresponding maps of the first and second torque distribution modes. By each map, a duty ratio of the current supplied to the electromagnetic coil 7a is determined so that the torque distribution of the front wheels 5a, 5b and the rear wheels 11a, 11b indicates a value suitable for the operating state.

In the first torque distribution mode, the torque distribution ratio of the front wheels to the rear wheels is changed to a predetermined ratio between 100:0 and 50:50 from 100:0 in accordance with operating conditions. In the second torque distribution mode, the torque distribution ratio of the front wheels to the rear wheels is changed to the predetermined ratio between 50:50 and 100:0 from 50:50 in accordance with the operating conditions. In the second torque distribution mode, as compared with the first torque distribution mode, the distribution of the torque to the front wheels 5a, 5b and rear wheels 11a, 11b is nearly equal. In a case where the coupling 7 is controlled in the second torque distribution mode in the same operating state, the torque is distributed to the front wheels 5a, 5b and rear wheels 11a, 11b more equally than in a case where the coupling 7 is controlled in the first torque distribution mode. When the control of the coupling 7 in the first torque distribution mode is compared with the control in the second torque distribution mode, a load applied to the transfer 3c of the transaxle 3 in the first torque distribution mode is smaller because the distribution of the torque to the rear wheels 11a, 11b is smaller.

The CPU 22 is connected to a throttle opening sensor 32 via the input/output circuit 25, and a detection signal is inputted from the throttle opening sensor 32. The throttle opening sensor 32 is disposed in the throttle valve to detect the opening of the valve. The CPU 22 calculates the opening of the throttle valve (throttle opening Th) at each time based on the detection signal from the throttle opening sensor 32.

The CPU 22 calculates a vehicle speed V. The vehicle speed V is obtained by calculation of an average value of rotation speeds of the rear wheels 11a, 11b having little slip. The CPU 22 refers to a two-dimensional map (threshold value setting map) constituted of the vehicle speed V and throttle opening Th (%) to calculate a throttle opening threshold value T1 corresponding to the existing vehicle speed V. The above-described map is stored beforehand in the ROM 23. It is to be noted that the throttle opening threshold value T1 is a value by which the opening of the throttle valve is determined.

The CPU 22 is connected to wheel speed sensors 33a to 33d for detecting the rotation speeds of the front and rear wheels 5a, 5b, 11a, and 11b respectively via the input/output circuit 25. The CPU 22 inputs the detection signals from the wheel speed sensors 33a to 33d, and calculates rotation speeds VFL, VFR, VRL, and VRR of the front and rear wheels 5a, 5b, 11a, and 11b respectively based on the respective detection signals.

The CPU 22 obtains an average front wheel rotation speed VFN (=(VFL+VFR)/2) from the rotation speeds VFL, VFR of the front wheels 5a, 5b, and calculates an average rear wheel rotation speed VRN (=(VRL+VRR)/2) from the rotation speeds VRL, VRR of the rear wheels 11a, 11b. That is, the average rear wheel rotation speed VRN corresponds to the vehicle speed V. Furthermore, the CPU 22 calculates a rotation speed difference $\Delta N$ (=|VFN−VRN|) from the average front wheel rotation speed VFN and average rear wheel rotation speed VRN.

The CPU 22 is connected to a steering angle sensor 34 via the input/output circuit 25. The CPU 22 inputs the detection signal from the steering angle sensor 34. The steering angle sensor 34 is disposed in a steering wheel (not shown) to detect the steering angle $\theta$ of the steering wheel. The CPU 22 calculates the steering angle $\theta$ of the steering wheel based on the detection signal from the steering angle sensor 34.

The CPU 22 is connected to a driving circuit 35 for supplying the current to the electromagnetic coil 7a of the coupling 7 via the input/output circuit 25. The CPU 22 outputs a duty ratio control signal to the driving circuit 35 so as to supply the current indicating the value calculated by the CPU 22 to the electromagnetic coil 7a. The driving circuit 35 is driven based on the duty ratio control signal, and the current indicating the value calculated by the CPU 22 is supplied to the electromagnetic coil 7a.

The CPU 22 uses the maps corresponding to the first and second torque distribution modes to determine a duty ratio indicating a target value of the current to be supplied to the electromagnetic coil 7a based on the above-described calculated throttle opening Th, rotation speed difference $\Delta N$, vehicle speed V, and steering angle $\theta$. The CPU 22 outputs the duty ratio control signal to the driving circuit 35 via the input/output circuit 25 in accordance with the determined duty ratio.

Figure 3:
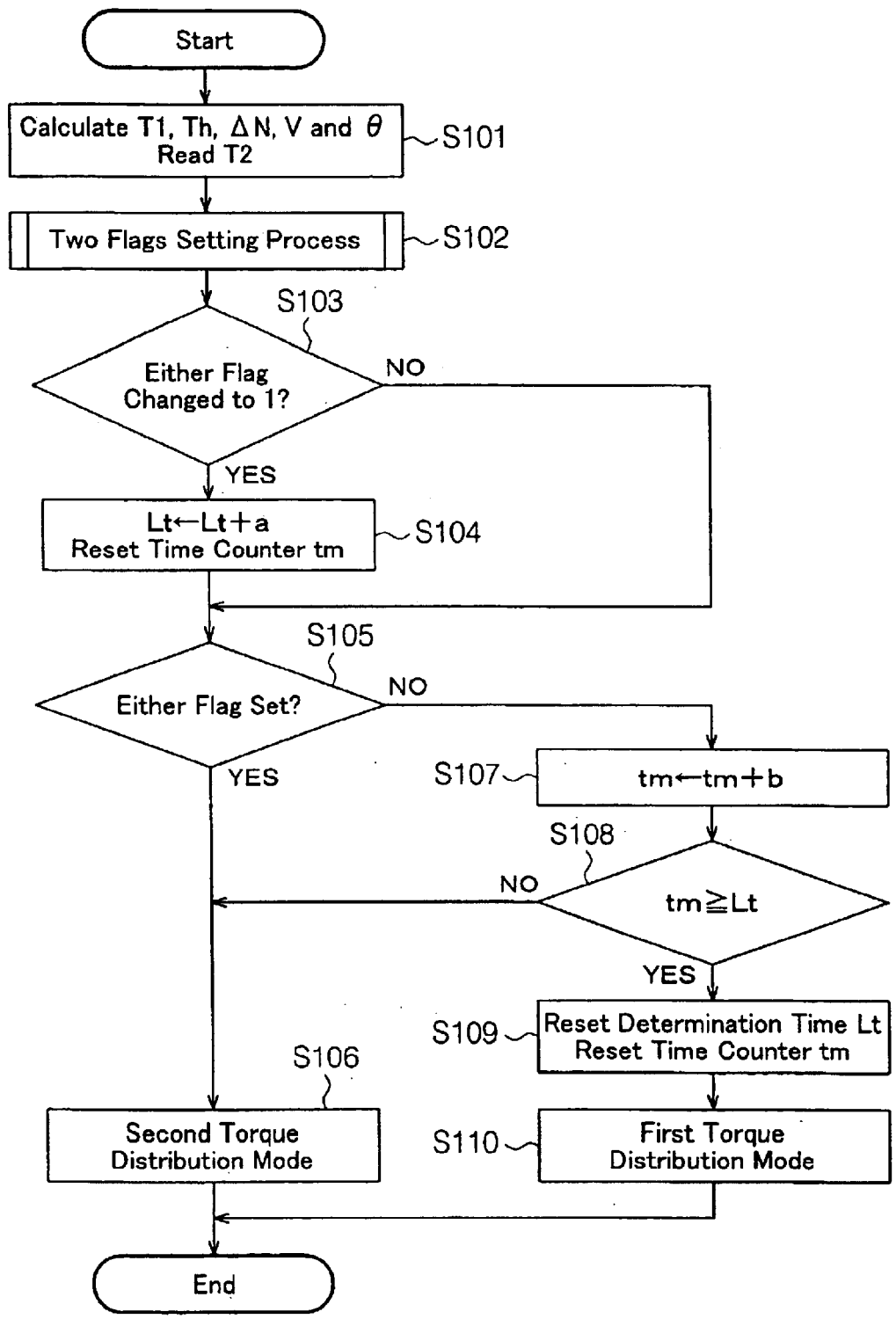
FIG. 3 is a flowchart of a mode switch control when operating the four-wheel drive vehicle.

FIG. 3 is a flowchart of a mode switch control program processed by the CPU 22 by regular interrupt.

In step S101, the CPU 22 calculates the throttle opening threshold value T1, throttle opening Th, rotation speed difference $\Delta N$, vehicle speed V, and steering angle $\theta$ based on the detection signals from the throttle opening sensor 32, wheel speed sensors 33a to 33d, and steering angle sensor 34. Moreover, the CPU 22 reads a steering angle threshold value T2 stored beforehand in the ROM 23. The steering angle threshold value T2 is a value at which the steering angle of the steering wheel is determined.

Next, in step S102, the CPU 22 executes a setting process of a throttle opening determination flag, that is, determines a size relation between the throttle opening Th and the throttle opening threshold value T1. When the value of the throttle opening Th is larger than the throttle opening threshold value T1, the CPU 22 determines that the four-wheel drive vehicle 1 is accelerating and sets the value of the throttle opening determination flag to 1. On the other hand, when the value of the throttle opening Th is not more than the throttle opening threshold value T1, the CPU 22 resets the value of the throttle opening determination flag to 0. The value just before the throttle opening determination flag is updated is replaced as a throttle opening history flag.

In step S102, the CPU 22 also performs a setting process of a steering angle determination flag, that is, determines the size relation between the value of the steering angle $\theta$ and the steering angle threshold value T2. When the value of the steering angle $\theta$ is larger than the steering angle threshold value T2, the CPU 22 determines that the steering angle of the steering wheel is large and sets the steering angle determination flag to 1. On the other hand, when the value of the steering angle $\theta$ is not more than the steering angle threshold value T2, the CPU 22 resets the value of the steering angle determination flag to 0. The value just before the value of the steering angle determination flag is updated is replaced as the value for a steering angle history flag.

Figure 4:
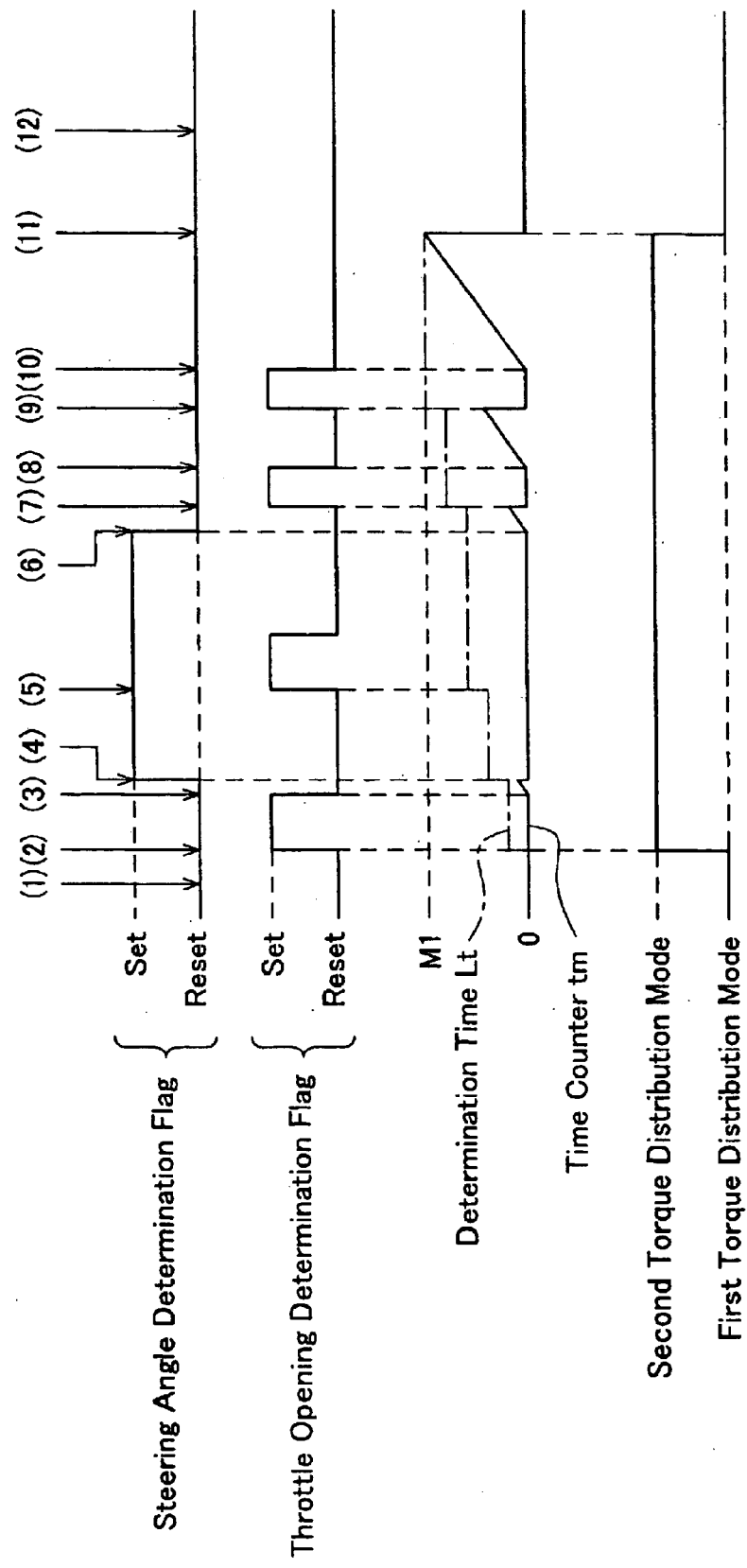
FIG. 4 is a timing chart showing various types of processes when operating the four-wheel drive vehicle.

In step S103, the CPU 22 determines whether or not steering of the steering wheel has been started, or whether or not the four-wheel drive vehicle 1 has started accelerating. If YES in step S103, that is, when at least one of the throttle opening determination flag and the steering angle determination flag is changed to 1, in other words, when the operating parameters meet predetermined judgment conditions, the CPU 22 selects the second torque distribution mode, and the process shifts to step S104. If NO in the step S103, that is, when both the throttle opening determination flag and the steering angle determination flag are changed to 0, the CPU 22 shifts to the process of step S105. For example, (2), (5), (7), and (9) of FIG. 4 show a time when the throttle opening history flag is reset and the throttle opening determination flag is set. That is, (2), (5), (7), and (9) of FIG. 4 show that the throttle opening determination flag is changed to 1. On the other hand, for example, (3), (8), and (10) of FIG. 4 show that the steering angle determination flag is in a reset state, the throttle opening history flag is set, and the throttle opening determination flag is reset. That is, (3), (8), and (10) of FIG. 4 show a time when the throttle opening determination flag and the steering angle determination flag indicate 0.

The CPU 22 includes a timer. The timer counts a certain time counter tm which is a time from when either flag of the throttle opening determination flag and the steering angle determination flag is reset to 0 until another flag is set to 1. It is to be noted that the value of the time counter tm is 0 in a case other than the case where either flag of the two flags is reset and subsequently the other flag is set.

It is to be noted that FIG. 4 shows changes of set and reset states of the steering angle determination flag and the throttle opening determination flag with time. FIG. 4 also shows a determination time Lt described later, time counter tm, and the corresponding torque distribution modes in accordance with these operating parameters. It is to be noted that an initial value of the determination time Lt is 0.

In step S104, the CPU 22 updates a value obtained by adding a predetermined addition value x larger than 0 to the existing determination time Lt as the latest determination time Lt. Furthermore, the CPU 22 resets the value of the time counter tm to 0 (see (2), (4), (5), (7), and (9) of FIG. 4). It is to be noted that the CPU 22 sets the value of the determination time Lt to a first upper limit value M1, when the value of the latest determination time Lt exceeds the first upper limit value M1 which is larger than 0 and stored in the ROM 23. Also in this case, the CPU 22 resets the value of the time counter tm to 0 (see (11) of FIG. 4). It is to be noted that the addition value x may not be constant and may also be variable.

That is, in step S104, the CPU 22 integrates the determination time Lt and resets the value of the time counter tm to 0, when at least one of the throttle opening determination flag and the steering angle determination flag is changed to the set state from the reset state.

In step S105, the CPU 22 determines whether or not at least one of the throttle opening determination flag and the steering angle determination flag is now set to 1. In other words, in step S105, the CPU 22 determines whether or not the four-wheel drive vehicle 1 is now accelerating, or the steering wheel is being steered. If YES in step S105, that is, when the four-wheel drive vehicle 1 is accelerating, or when the steering wheel is being steered, the CPU 22 shifts the process to step S106 so as to control the coupling 7 in the second torque distribution mode (see (2), (4), (5), (7), and (9) of FIG. 4). On the other hand, if NO in step S105, the CPU 22 shifts to the process step S107 (see (1), (3), (6), (8), and (10) to (12) of FIG. 4).

In step S106, the CPU 22 controls the coupling 7 based on the map of the second torque distribution mode, and ends this program.

In step S107, the CPU 22 updates the value obtained by adding a count value b larger than 0 to the existing value of the time counter tm as the latest value of the time counter tm, and shifts to the process of step S108.

In the step S108, the CPU 22 judges whether or not the latest value of the time counter tm is not less than that of the determination time Lt. That is, in step S108, the CPU 22 determines whether or not a predetermined time (duration) has elapsed after the four-wheel drive vehicle 1 is not accelerating any more or after the steering wheel has stopped being operated. If YES in step S108, that is, when the latest value of the time counter tm is not less than that of the determination time Lt, the CPU 22 shifts the process to step S109 (see (1), (11), and (12) of FIG. 4). On the other hand, if NO in step S108, that is, when the latest value of the time counter tm is smaller than that of the determination time Lt, the CPU 22 shifts the process to step S106 (see (3), (6), (8), and (10) of FIG. 4).

In the present embodiment, when the determination time Lt indicates 0, the time counter tm is not counted.

In step S109, the CPU 22 resets both of the latest values of the time counter tm and the determination time Lt to 0, and shifts the process to step S110.

In step S110, the CPU 22 controls the coupling 7 in the first torque distribution mode, and ends this program.

The present embodiment has the following advantages.

When the set and reset states of the throttle opening determination flag and the steering angle determination flag are alternately repeated, that is, when the four-wheel drive vehicle 1 repeats acceleration/deceleration, or when the four-wheel drive vehicle 1 alternately repeats an operating state of traveling around a curve and a straight travel operating state, the CPU 22 controls the coupling 7 so as to preferentially perform the second torque distribution mode in which the torque is nearly equally distributed to the front wheels 5a, 5b and rear wheels 11a, 11b. Therefore, the ECU 21 including the CPU 22 inhibits excessive change of the torque distribution of the front wheels 5a, 5b and the rear wheels 11a, 11b. As a result, vehicle behavior change can be reduced. Moreover, since the vehicle behavior change can be reduced, the driver's comfort is not impaired.

When either one of the steering angle determination flag and the throttle opening determination flag is changed to the set state from the reset state, the CPU 22 adds the addition value x to the existing determination time Lt to set the latest determination time Lt. The CPU 22 controls the coupling 7 in the second torque distribution mode until the latest time counter tm reaches the latest determination time Lt. Therefore, for example, when a state in which the four-wheel drive vehicle 1 frequently repeats acceleration/deceleration, or a state in which the four-wheel drive vehicle 1 frequently repeats slalom-type operation continues, the determination time Lt lengthens. Therefore, the coupling 7 can be controlled in the second torque distribution mode in which the torque is almost equally distributed to the front wheels 5a, 5b and the rear wheels 11a, 11b. Therefore, the torque distribution ratio of the front wheels 5a, 5b and the rear wheels 11a, 11b can be inhibited from excessively changing.

A second embodiment embodying the present invention will hereinafter be described with reference to FIGS. 5 to 7. It is to be noted that an apparatus constitution of the four-wheel drive vehicle 1 including the ECU 21 of the present embodiment is the same as that of the embodiment of FIGS. 1 to 4, and only the control program for the torque distribution is different from that of the embodiment of FIGS. 1 to 4.

In the present embodiment, the timer counts the time counter tm indicating a time from when either of the throttle opening determination flag and the steering angle determination flag is set. The initial value of the time counter tm is set to 0.

Figure 5:
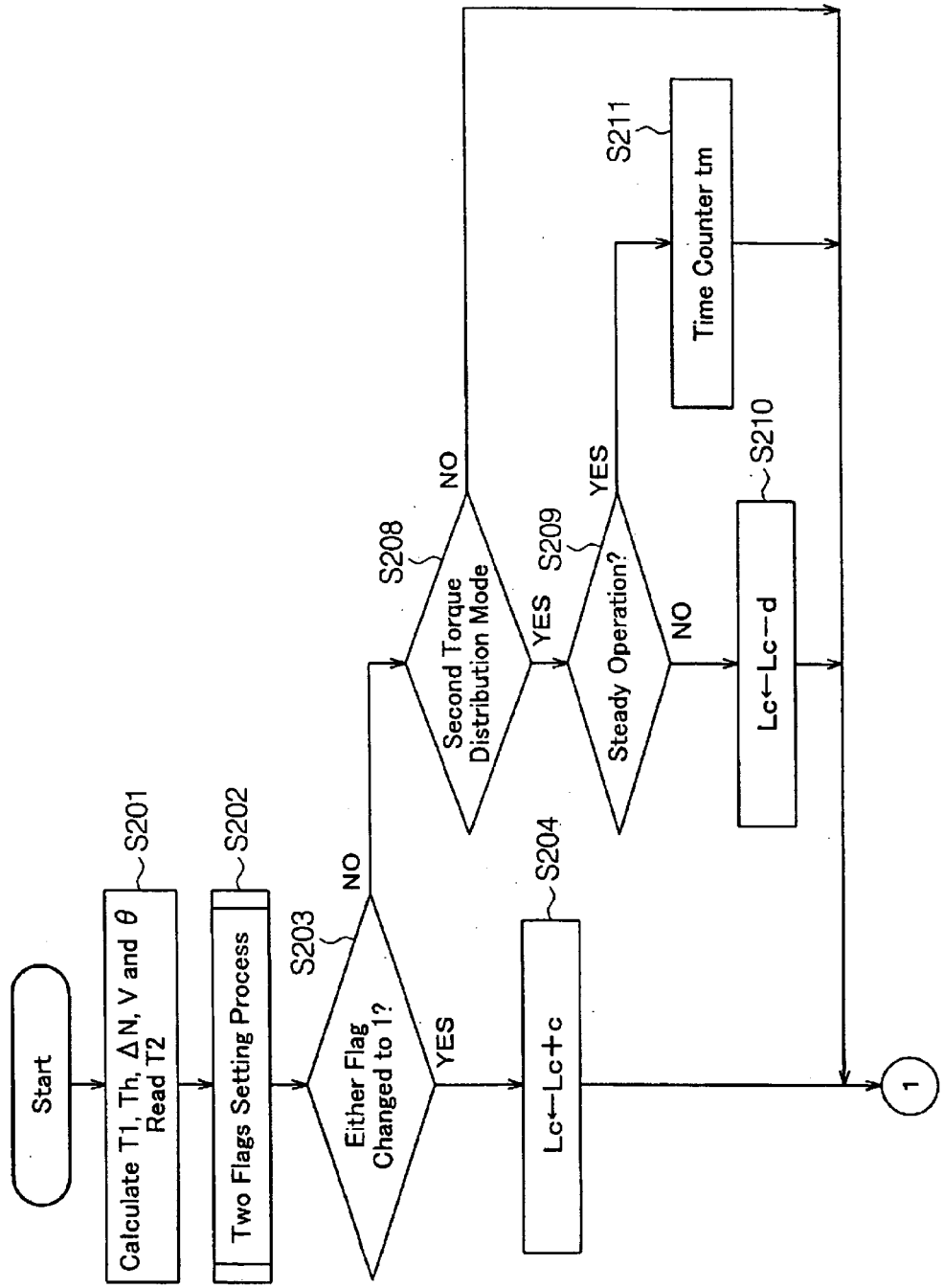
FIG. 5 is a flowchart of the mode switch control when operating the four-wheel drive vehicle in a second embodiment.
Figure 6:
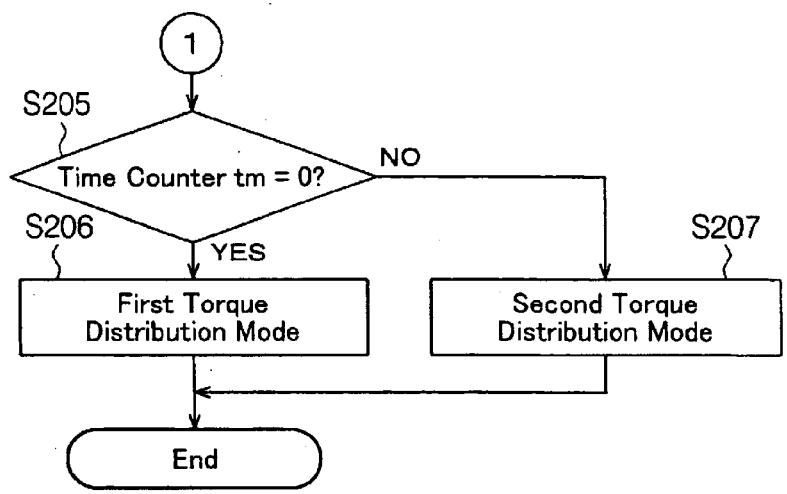
FIG. 6 is a flowchart of the mode switch control when operating the four-wheel drive vehicle in the second embodiment.

FIGS. 5 and 6 are flowcharts of a mode switch control program processed by the CPU 22 by the regular interrupt.

In steps S201 and S202, the CPU 22 performs the process similar to that of steps S101 and S102 in FIG. 3.

Next, in step S203, the CPU 22 determines whether or not either of the throttle opening determination flag and the steering angle determination flag is now set to 1. If YES in step S203, that is, when either one of the two flags is set to 1, the CPU 22 shifts the process to step S204. If NO in step S203, the CPU 22 shifts the process to step S208. For example, (2), (5), (7), (8), and (11) of FIG. 7 show that either one of the two flags is now set to 1. On the other hand, for example, (3), (4), (6), (9), and (12) of FIG. 7 show that the two flags are reset to 0.

Figure 7:
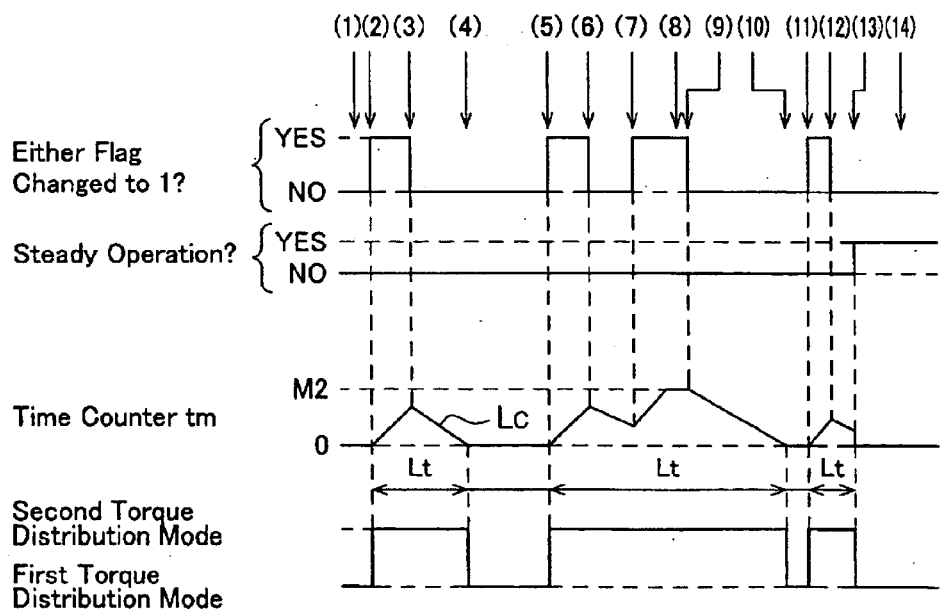
FIG. 7 is a timing chart showing various types of processes when operating the four-wheel drive vehicle in the second embodiment.

It is to be noted that FIG. 7 shows the values of the two flags, the time counter tm, steady operation determination described later, and the torque distribution modes corresponding to these operating parameters.

When the process shifts to step S204 from step S203, the four-wheel drive vehicle 1 is in an operating state in which it is necessary to control the coupling 7 in the second torque distribution mode. On the other hand, when the process shifts to step S208 from step S203, the four-wheel drive vehicle 1 is in an operating state in which the coupling 7 does not necessarily have to be now controlled in the second torque distribution mode.

In step S204, the CPU 22 updates the value obtained by adding a predetermined addition value c larger than 0 to the existing time counter tm as the latest time counter tm, and shifts the process to step S205. When either one of the two flags is first set to 1, the CPU 22 adds the addition value c to the time counter tm whose initial value is 0 to set the latest time counter tm. When the latest value of the time counter tm exceeds a second upper limit value M2 which is larger than 0 and stored in the ROM 23, the CPU 22 changes the latest value of the time counter tm to the second upper limit value M2, and subsequently changes the process to step S205 shown in FIG. 6 (see (8) of FIG. 7). It is to be noted that the addition value c may also be the variable.

It is to be noted that the determination time Lt in the present embodiment indicates a time from when the value of the time counter tm exceeds 0 until the value returns to 0 again.

In step S205, the CPU 22 determines whether or not the latest value of the time counter tm is 0. If YES in step S205, that is, when the value of the time counter tm is 0, the CPU 22 shifts the process to step S206 (see (1), (4), (10), (13), and (14) of FIG. 7). On the other hand, if NO in step S205, the CPU 22 shifts the process to step S207 (see (2), (3), (5) to (9), (11), and (12) of FIG. 7).

In step S206, the CPU 22 controls the coupling 7 in the first torque distribution mode, and ends the program.

On the other hand, in step S207, the CPU 22 controls the coupling 7 in the second torque distribution mode, and ends this program. It is to be noted that when the process shifts to step S205 from step S203 via step S204, the process surely shifts to step S207. When step S203 shifts to step S205 via step S204, in the operating state, at least one of the two flags is set to 1, that is, the four-wheel drive vehicle 1 now requires the second torque distribution mode, and in this reset state, the process surely shifts to step S207.

As shown in FIG. 5, if NO in step S203, the CPU 22 shifts the process to step S208. In the step S208, the CPU 22 determines whether or not the coupling 7 is now controlled in the second torque distribution mode. If YES in step S208, that is, when the coupling 7 is now controlled in the second torque distribution mode, the CPU 22 shifts the process to step S209 (see (3), (6), (9), (12), and (13) of FIG. 7). On the other hand, if NO in step S208, the CPU 22 shifts the process to step S206 via step S205 (see (1), (4), (10), and (14) of FIG. 7).

When step S208 of FIG. 5 shifts to step S205 of FIG. 6, the CPU 22 is now controlling the coupling 7 in the first torque distribution mode, and the value of the time counter tm is surely 0. When the process shifts to step S205 from step S208, the CPU 22 surely shifts the process to step S206.

On the other hand, if YES in step S208 of FIG. 5, in the state in which the coupling 7 is now controlled in the second torque distribution mode, the CPU 22 shifts the process to step S209. In step S209, the CPU 22 determines whether or not the four-wheel drive vehicle 1 performs steady operation. The steady operation indicates a state in which the four-wheel drive vehicle 1 travels along a straight road at a constant speed. The CPU 22 determines that the four-wheel drive vehicle 1 is steadily operating, when the values of the rotation speed difference ΔN, vehicle speed V, throttle opening Th, and steering angle θ (the operating parameters of the operation state) are smaller than the corresponding predetermined threshold values.

If YES in step S209, that is, when the four-wheel drive vehicle 1 is steadily operating, the CPU 22 shifts the process to step S211 (see (13) of FIG. 7). If NO in step S209, the CPU 22 shifts the process to step S210 (see (3), (6), (9), and (12) of FIG. 7).

In step S211, the CPU 22 resets the time counter tm to 0, and shifts the process to step S206 via step S205. When the process shifts to step S211 from step S209, the value of the time counter tm does not indicate 0, and the CPU 22 has to originally control the coupling 7 in the second torque distribution mode. However, in the state shown in (13), and (14) of FIG. 7, that is, in the state in which the four-wheel drive vehicle 1 is steadily operating, the CPU 22 determines that the existing state does not require the second torque distribution mode, and especially switches the second torque distribution mode to the first torque distribution mode to control the coupling 7 in the first torque distribution mode.

In step S210, the CPU 22 updates a value obtained by subtracting a subtraction value d larger than 0 from the existing value of the time counter tm as the latest time counter tm. Therefore, each subtraction value d is subtracted from the value of the time counter tm at a time when the throttle opening determination flag and the steering angle determination flag are reset in a predetermined period which is the duration.

The determination time Lt of the present embodiment includes a length of a time when either setting of the throttle opening determination flag and the steering angle determination flag continues, and a length of a predetermined time (duration) until the value of the time counter tm at the time of the change of the set state to the reset state reaches a value of 0 (see FIG. 7).

The addition value c is larger than the subtraction value d. When the existing value of the time counter tm is less than 0, the CPU 22 updates the value to 0, and subsequently shifts the process to step S205. Based on the determination in the step S205, the CPU 22 shifts the process to step S206 or S207, that is, controls the coupling 7 in the first or second torque distribution mode, and ends this program.

The present embodiment has the following advantages.

The CPU 22 controls the coupling 7 in the second torque distribution mode for the determination time Lt corresponding to a time from when either of the two flags is set until the value of the time counter tm returns to 0. That is, in the operating state in which the four-wheel drive vehicle 1 requires acceleration/deceleration, or in the operating state in which the four-wheel drive vehicle 1 requires slalom-type operation, the mode is not inadvertently changed to the first torque distribution mode, and the coupling 7 can be controlled in the second torque distribution mode. Therefore, also in the present embodiment, the torque distribution ratio can be inhibited from excessively changing.

When the four-wheel drive vehicle 1 performs steady operation, the CPU 22 controls the coupling 7 in the first torque distribution mode. Therefore, the CPU 22 does not control the coupling 7 in the second torque distribution mode more than necessary, and can secure operation with a low fuel consumption.

It is to be noted that the above-described embodiment may also be modified to the following embodiment.

In the respective embodiments of FIGS. 1 to 7, in the second torque distribution mode, the torque distribution ratio of the front wheels to the rear wheels may also be fixed to 50:50. Conversely, in the first torque distribution mode, the torque distribution ratio of the front wheels to the rear wheels may also be fixed to 100:0.

In the respective embodiments of FIGS. 1 to 7, a four-wheel drive vehicle of a front internal combustion engine/rear drive (FR) system or a rear internal combustion engine/rear drive (RR) system may also be embodied.

In the respective embodiments of FIGS. 1 to 7, the mechanism may also be changed to an electromagnetic clutch mechanism of a dry multiplate system. The coupling may also be changed to another coupling (hydraulic system, electromagnetic system, motor, and the like) in which the torque distribution is controllable.

In the embodiment of FIGS. 1 to 4, the CPU 22 may perform the steady operation determination used in the embodiment of FIGS. 5 to 7. Even in this case, when the CPU 22 determines that the four-wheel drive vehicle 1 performs steady operation, the coupling 7 is controlled in the first torque distribution mode.

In the embodiment of FIGS. 1 to 4, instead of adding the addition value x to the determination time Lt to change the value of the determination time Lt, the value of the determination time Lt may also be set so as to be always constant.

In the respective embodiments of FIGS. 1 to 7, in addition to the throttle opening Th and steering angle θ, the coupling 7 may also be controlled based on the size of at least one operating parameter in the operating state parameters including the rotation speed difference ΔN and vehicle speed V.

In the respective embodiments of FIGS. 1 to 7, the torque distribution may also be changed in response to the control of the CPU 22 in the following four-wheel drive vehicle. That is, this four-wheel drive vehicle includes an electronic control multiplate clutch in a center differential disposed in the vehicle. The torque distribution is arbitrary settable between a predetermined ratio determined by the center differential and a torque distribution ratio of the front wheels to rear wheels of 50:50, with the multiplate clutch in complete frictional engagement.

What is claimed is:

1. A driving force distribution control apparatus of a four-wheel drive vehicle, the vehicle including a drive source, front and rear wheels driven by torque generated by the drive source, and a coupling in which torque distribution to the front and rear wheels is changeable, the driving force distribution control apparatus comprising:

a controller for controlling the coupling, the controller including program logic that when executed causes the controller to:

control the coupling in a torque distribution mode selected from first and second torque distribution modes in accordance with operating parameters indicating an operating state of the vehicle, and in the second torque distribution mode, the torque is distributed to the front and rear wheels more equally than in the first torque distribution mode, and set duration of the second torque distribution mode, when the second torque distribution mode is selected, and continues to control the coupling in the second torque distribution mode regardless of the operating parameters until the duration elapses.

2. The driving force distribution control apparatus according to claim 1, wherein the controller sets the duration in accordance with changes of the operating parameters when the coupling is being controlled in the second torque distribution mode.

3. The driving force distribution control apparatus according to claim 1, wherein the controller selects the second torque distribution mode, when the operating parameters satisfy predetermined judgment conditions, and the controller sets the duration in accordance with frequency of changes between states in which the operating parameters satisfy and do not satisfy the judgment conditions.

4. The driving force distribution control apparatus according to claim 3, wherein the controller increases the duration at every change to the state in which the operating parameters satisfy the judgment conditions from the state in which the operating parameters do not satisfy the judgment conditions, while the coupling is controlled in the second torque distribution mode.

5. The driving force distribution control apparatus according to claim 1, wherein the controller selects the second torque distribution mode, when the operating parameters satisfy predetermined judgment conditions, and the controller sets the duration in accordance with a length of a time for which the operating parameters continuously satisfy the judgment conditions.

6. The driving force distribution control apparatus according to claim 5, wherein the controller increases the duration, as the time in which the operating parameters continuously satisfy the judgment conditions lengthens.

7. The driving force distribution control apparatus according to claim 3, wherein the controller continues the control of the coupling in the second torque distribution mode for the existing set duration, after the state of the operating parameters satisfying the judgment conditions changes to the state in which the judgment conditions are not satisfied.

8. The driving force distribution control apparatus according to claim 1, wherein the controller determines whether or not the vehicle performs steady operation based on the operating parameters, and sets a control mode of the coupling to the first torque distribution mode regardless of the duration, when the vehicle is determined to perform steady operation.

9. The driving force distribution control apparatus according to claim 1, wherein either the front wheels or the rear wheels are the main drive wheels coupled to the drive source not via the coupling, and the others are the sub-drive wheels coupled to the drive source via the coupling.

10. The driving force distribution control apparatus according to claim 9, wherein the controller controls the coupling so as to increase the torque distribution to the sub-drive wheels more in the second torque distribution mode than in the first torque distribution mode.

11. The driving force distribution control apparatus according to claim 1, wherein the vehicle includes a steering wheel rotatable to different steering angles, the drive source includes a throttle valve having an opening that can be closed and opened, and the operating parameters include at least one of the opening of the throttle valve and the steering angle of the steering wheel.

12. A driving force distribution method for a four-wheel drive vehicle, the vehicle including a drive source, front and rear wheels driven by torque generated by the drive source, and a coupling in which torque distribution to the front and rear wheels is changeable, the driving force distribution control method comprising:

controlling the coupling in a torque distribution mode selected from first and second torque distribution modes in accordance with operating parameters indicating an operating state of the vehicle, in which in the second torque distribution mode, torque is distributed to the front and rear wheels more equally than in the first torque distribution mode;

setting duration of the second torque distribution mode, when the second torque distribution mode is selected; and continuing the control of the coupling in the second torque distribution mode regardless of the operating parameters until the duration elapses.

13. The driving force distribution control method according to claim 12, wherein the duration is set in accordance with changes of the operating parameters when the coupling is being controlled in the second torque distribution mode.

14. The driving force distribution control method according to claim 12, further comprising: selecting the second torque distribution mode when the operating parameters satisfy predetermined judgment conditions, and setting the duration in accordance with frequency of changes between states in which the operating parameters satisfy and do not satisfy the judgment conditions.

15. The driving force distribution control method according to claim 14, wherein the duration is increased at every change to the state in which the operating parameters satisfy the judgment conditions from the state in which the operating parameters do not satisfy the judgment conditions, while the coupling is controlled in the second torque distribution mode.

16. The driving force distribution control method according to claim 12, further comprising: selecting the second torque distribution mode when the operating parameters satisfy predetermined judgment conditions, and setting the duration in accordance with a length of a time for which the operating parameters continuously satisfy the judgment conditions.

17. The driving force distribution control method according to claim 16, wherein the duration is increased as the time in which the operating parameters continuously satisfy the judgment conditions lengthens.

18. The driving force distribution control method according to claim 14, wherein the control of the coupling in the second torque distribution mode is continued for the existing set duration, after the state of the operating parameters satisfying the judgment conditions changes to the state in which the judgment conditions are not satisfied.

19. The driving force distribution control method according to claim 12, further comprising:
   determining whether or not the vehicle performs steady operation based on the operating parameters; and
   setting a control mode of the coupling to the first torque distribution mode regardless of the duration when the vehicle is determined to perform the steady operation.

* * * * *